US008928809B2

(12) United States Patent  
Vanderhoff

(10) Patent No.: US 8,928,809 B2
(45) Date of Patent: Jan. 6, 2015

(54) SYNCHRONIZING VIDEOS

(75) Inventor: Earl Wayne Vanderhoff, Cranston, RI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 322 days.

(21) Appl. No.: 12/882,428

(22) Filed: Sep. 15, 2010

(65) Prior Publication Data

US 2012/0062793 A1 Mar. 15, 2012

(51) Int. Cl.
*H04N 5/04* (2006.01)
*H04N 5/14* (2006.01)
*H04L 7/02* (2006.01)

(52) U.S. Cl.
CPC ............... *H04N 5/147* (2013.01); *H04L 7/02* (2013.01); *H04N 5/04* (2013.01)
USPC ............................. 348/500; 375/354; 375/356

(58) Field of Classification Search
CPC ............. H04L 7/02; H04N 5/04; H04N 5/147
USPC .................................... 348/500; 375/354, 356
See application file for complete search history.

(56) References Cited

U.S. PATENT DOCUMENTS

| 6,137,834 | A  | * | 10/2000 | Wine et al. ..................... 375/240 |
| 6,456,591 | B1 | * | 9/2002  | Mishra ............................ 370/229 |
| 6,996,173 | B2 | * | 2/2006  | Wu et al. ..................... 375/240.1 |
| 8,042,132 | B2 | * | 10/2011 | Carney et al. ..................... 725/37 |
| 8,094,872 | B1 | * | 1/2012  | Yagnik et al. ................. 382/100 |
| 8,107,539 | B2 | * | 1/2012  | Hannuksela et al. .... 375/240.26 |
| 8,413,205 | B2 | * | 4/2013  | Carney et al. ................. 725/135 |
| 2003/0058935 | A1 | * | 3/2003 | Lippincott ................. 375/240.2 |
| 2004/0139462 | A1 | * | 7/2004 | Hannuksela et al. ........... 725/32 |
| 2005/0120132 | A1 | * | 6/2005 | Hutter ........................... 709/234 |
| 2006/0280246 | A1 | * | 12/2006 | Alattar et al. ............ 375/240.15 |
| 2007/0110150 | A1 | * | 5/2007 | Wang et al. ................. 375/240.1 |
| 2008/0022005 | A1 | * | 1/2008 | Wu et al. ........................ 709/231 |
| 2008/0030617 | A1 | * | 2/2008 | Sasai et al. ..................... 348/500 |
| 2008/0168520 | A1 | * | 7/2008 | Vanderhoff et al. .......... 725/131 |
| 2008/0177864 | A1 | * | 7/2008 | Minborg et al. .............. 709/219 |
| 2009/0122189 | A1 | * | 5/2009 | Wang et al. ................... 348/500 |
| 2009/0122197 | A1 | * | 5/2009 | Neal ............................. 348/708 |
| 2009/0144325 | A1 | * | 6/2009 | Chastagnol et al. ....... 707/104.1 |
| 2009/0147859 | A1 | * | 6/2009 | McGowan et al. ...... 375/240.26 |
| 2009/0154816 | A1 | * | 6/2009 | Swazey et al. ................. 382/232 |
| 2009/0167942 | A1 | * | 7/2009 | Hoogenstraaten et al. ... 348/500 |
| 2009/0262244 | A1 | * | 10/2009 | Buttimer et al. .............. 348/572 |
| 2009/0304082 | A1 | * | 12/2009 | Radhakrishnan et al. ......................... 375/240.15 |
| 2010/0110186 | A1 | * | 5/2010 | Julia et al. ..................... 348/143 |
| 2010/0287196 | A1 | * | 11/2010 | Shields et al. ................ 707/769 |
| 2010/0329337 | A1 | * | 12/2010 | Mulroy ..................... 375/240.13 |
| 2011/0122315 | A1 | * | 5/2011 | Schweiger et al. ........... 348/500 |
| 2012/0114302 | A1 | * | 5/2012 | Randall ......................... 386/241 |

FOREIGN PATENT DOCUMENTS

WO WO 2005011281 A1 * 2/2005 ............... H04N 7/24

* cited by examiner

*Primary Examiner* — Nasser Goodarzi
*Assistant Examiner* — Michael B Pierorazio

(57) ABSTRACT

A device may receive a first video, receive a second video, and locate first frames, in the first video, in which a first change in scene occurs. In addition, the device may locate second frames, in the second video, in which a second change in scene occurs. Further, the device may determine whether the first change in scene matches the second change in scene and achieve synchronization when the first change in scene matches the second change in scene.

19 Claims, 14 Drawing Sheets

SYNCHRONIZING VIDEOS

BACKGROUND

To employ a computer in the analysis of a video signal, it may be necessary to first encode the video into a format that may be easily recognized and manipulated by the computer. This is accomplished via a video encoder. Therefore, the perceived quality of video that a set-top box outputs depends on the capabilities of the video encoder and the original video signal.

When the encoder digitizes a video program, the signal that the encoder generates may depend on the precise starting point, in the video program, at which the video server begins the encoding. This is particularly true for encoding schemes that employ temporal compression, such as MPEG2 and MPEG 4. Furthermore, Gaussian noise in the video stream will be different for different encoding sessions. Consequently, even from the same video program, it is unlikely that the video encoder will generate an identical video signal across two encoding sessions.

When set-top boxes of the same make and model receive an encoded video signal from the same video stream, the set-top boxes may generate different output video signals. There are many reasons for the differences. One reason may be that the set-top boxes use different decoding algorithms (e.g., different versions of a decoder). Another reason may be that the set-top boxes produce different amounts of noise in the output video signals. Yet another reason may be that, with respect to hue, color, and saturation, each set-top box may be calibrated differently from other set-top boxes. Yet another reason may be that each set-top box is designed to generate output video whose quality depends on a processing load of the set-top box, and the set-top boxes may be under different processing loads. For example, the set-top boxes may use a decoding algorithm in which rendering a particular frame depends on minute delays in processing.

DETAILED DESCRIPTION

The following detailed description refers to the accompanying drawings. The same reference numbers in different drawings may identify the same or similar elements.

As used herein, the term "frame" or "image" may refer to an image or an image portion that is copied or obtained from another image. A frame may be obtained from different sources, such as a camera, video stream, photograph, picture, etc. The term "video" may include multimedia content (e.g., a movie, sports program, television program, etc.). Depending on the context, the term "video" and "video stream" may be used interchangeably.

In the following, a device may synchronize two videos/video streams. That is, the device may locate a sequence of frames (e.g., images) in a first video stream and a corresponding sequence of similar frames in a second video stream. The device may synchronize the two videos over a time span.

Figure 1:
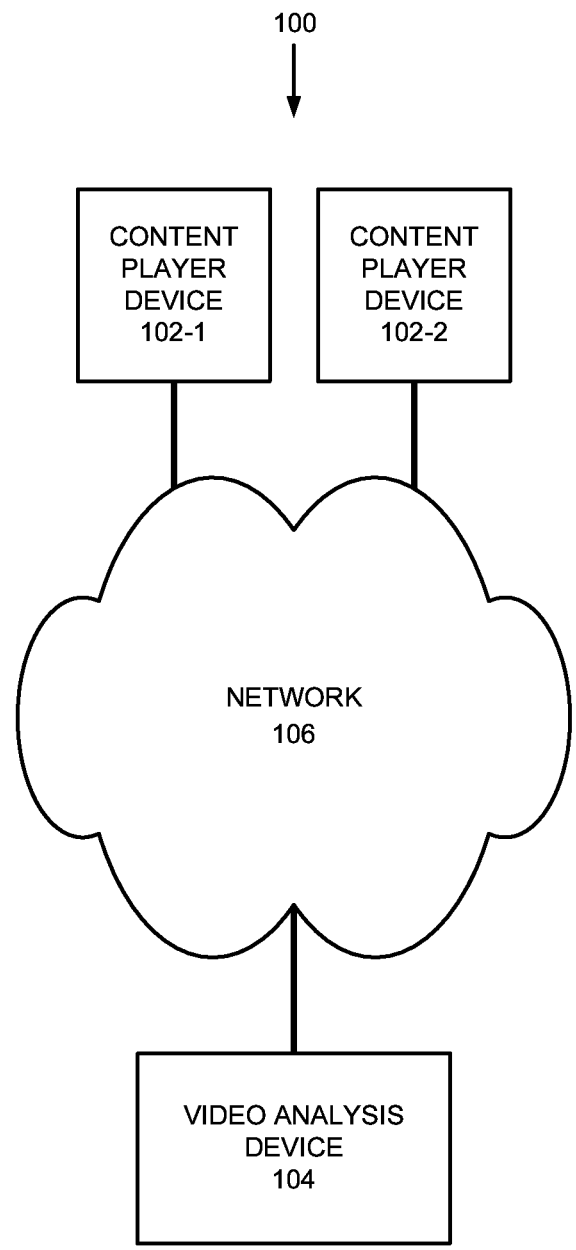
FIG. 1 is a diagram illustrating an exemplary environment in which a device for synchronizing two video may be used.

FIG. 1 illustrates an exemplary system 100 in which a device for synchronizing two video may be used. System 100 may include content player device 102-1 (e.g., a set-top box, computer, digital video recorder (DVR), digital video disc (DVD) player, video-on-demand server, etc.), content player device 102-2, a video analysis device 104, and network 106. Although not illustrated in FIG. 1 for simplicity, system 100 may include fewer or additional content player devices (e.g., one device, thousands of devices, etc.), additional video analysis devices, and/or other types of network elements (e.g., router, switch, firewall, gateways, servers, etc.).

Content player devices 102-1 and 102-2 and video analysis device 104 may each include a computer-like devices and/or components for handling video streams. Network 106 may include a wired or wireless network over which devices communicate (e.g., a fiber-optic network, a local area network (LAN), a wide area network (WAN), a wireless LAN, a metropolitan area network (MAN), a cellular network, a public switched telephone network (PSTN), an intranet, the Internet, a satellite-based network, any other network, or a combination of networks).

In system 100, when content player device 102-2 outputs a first video stream to video analysis device 104, video analysis device 104 may store the first video stream, for example, as a file or as a sequence of files ("first file" or "first sequence of files"). Each of the files may include a frame of the first video stream. When content player device 102-1 sends a second video stream to video analysis device 104, video analysis device 104 may store the second video stream as a second file/sequence of files. Video analysis device 104 may synchronize the first and second video streams by comparing the first file/sequence of files to the second file/sequence of files. In some implementations, the names of files may indicate the numerical sequence of the corresponding frames within a video stream.

Depending on the implementation, video analysis device 104 may synchronize two videos for different reasons. For example, in one implementation, video analysis device 104 may synchronize the two videos to determine the quality of the second video stream relative to the first. This may allow, for example, a vendor of content player device 102-1/102-2 or content provider (e.g., one who provides the first/second video stream) to improve or modify its products and/or services.

In another example, video analysis device 104 may synchronize the two videos to detect whether a first video includes a copy of all or a portion of the second video. Accordingly, based on a result of the detection, a user may determine, for example, whether a manufacturer/distributor of the first video qualifies as a potential copyright infringer.

In yet another example, a user may obtain and send a sample video (e.g., the first video stream) to a service/content provider. The service/content provider may use the sample video to identify a full-length video that includes and, therefore, synchronizes with the sampled video. The service/content provider may send the full-length video or information identifying the full-length video to the user.

Figure 2:
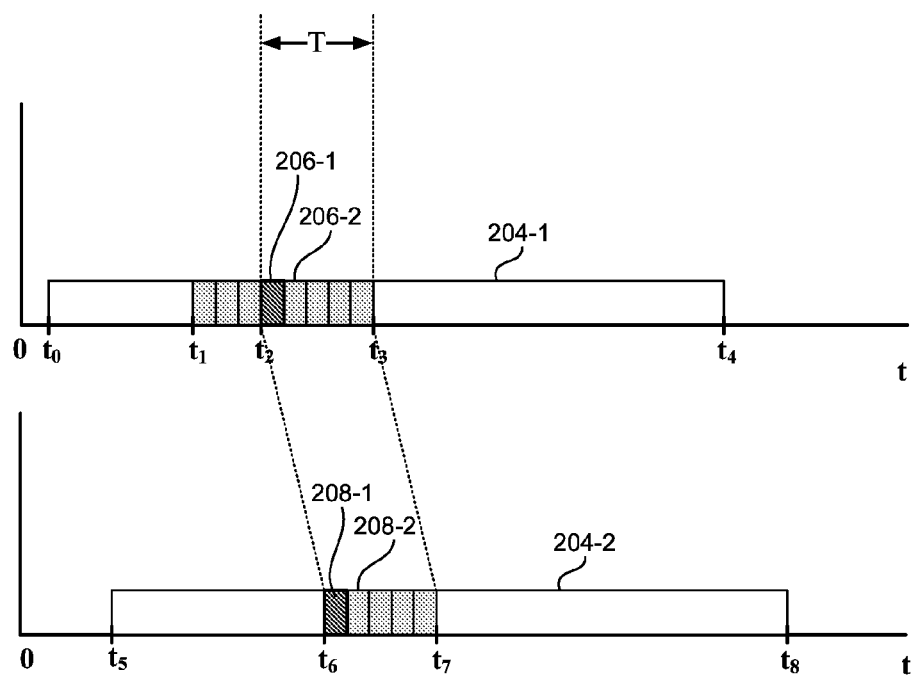
FIG. 2 is an overview of an exemplary process for synchronizing two videos.

FIG. 2 is an overview of an exemplary process for synchronizing two videos. Assume that a first video stream 204-1 and a second video stream 204-2 are played by one or more content player devices 102. As shown, first video stream 204-1 begins at $t_0$ and ends at $t_4$, and second video stream 204-2 begins at $t_5$ and ends at $t_8$.

In FIG. 2, video analysis device 104 begins the video synchronization process by examining frames of first video stream 204-1, starting at the frame at $t_1$. When video analysis device 104 detects a change in scene between a frame 206-1, which occurs at $t_2$, and a frame 206-2 in first video stream 204-1, video analysis device 104 searches for similar, corresponding frames in second video stream 206-2. That is, video analysis device 104 uses frames 206-1 and 206-2 as an anchor to which video analysis device 104 synchronizes second video stream 204-2.

Upon locating frames 208-1 and 208-2 as the frames corresponding to frames 206-1 and 206-2, video analysis device 104 may match other frames following 206-2 to the corresponding frames in video stream 204-2 (e.g., match other frames between times $t_3$ and $t_2$ in first video stream 204-1 to other frames between times $t_7$ and $t_6$ in second video stream 204-2) to continue to synchronize two video streams 204.

Figure 3:
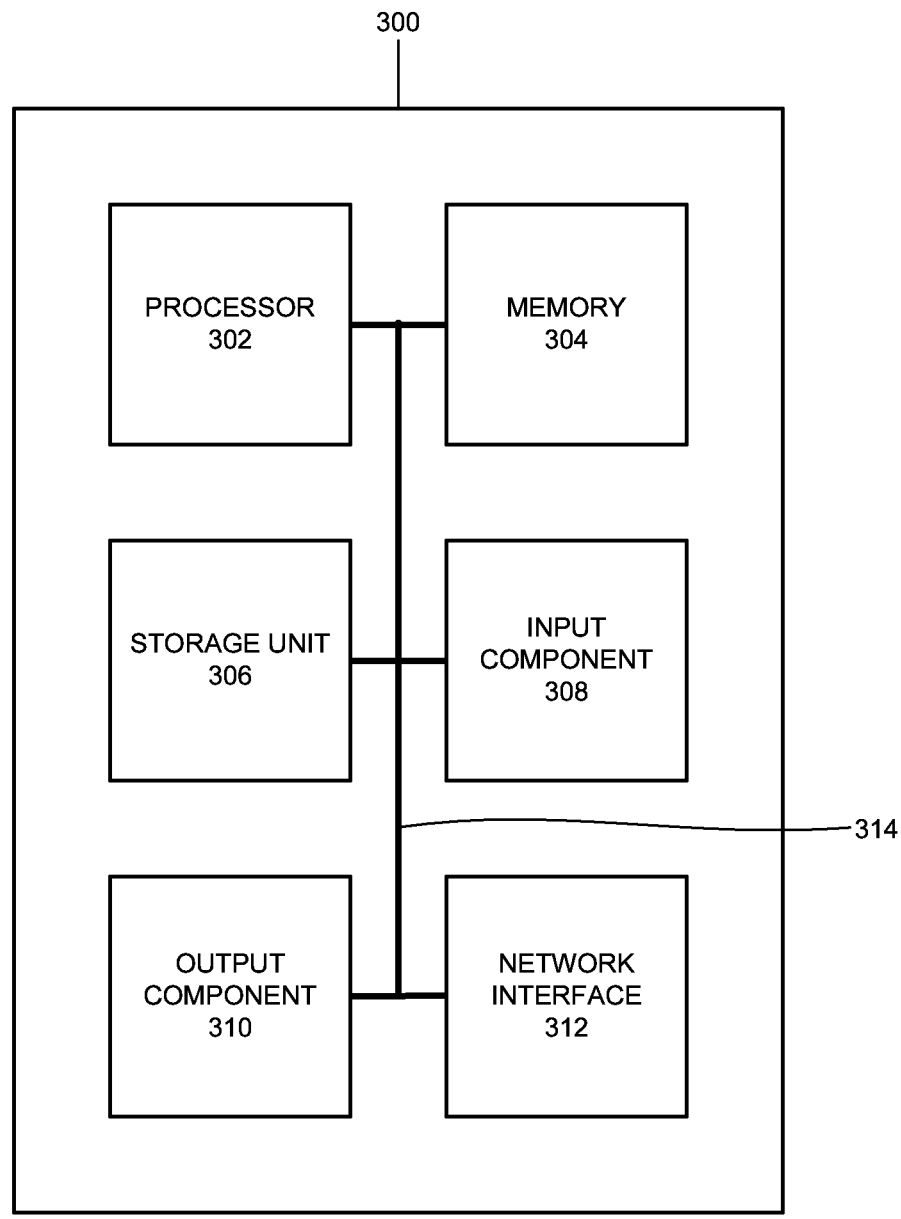
FIG. 3 is a block diagram illustrating exemplary components of the video analysis device of FIG. 1.

FIG. 3 is a block diagram of an exemplary network device 300, which may correspond to one or more of devices 102-1, 102-2, and 104. As shown, network device 300 may include a processor 302, memory 304, storage unit 306, input component 308, output component 310, network interface 312, and communication path 314. In different implementations, network device 300 may include additional, fewer, different, or different arrangement of components than the ones illustrated in FIG. 3. For example, network device 300 may include line cards for connecting to external buses.

Processor 302 may include a processor, a microprocessor, an Application Specific Integrated Circuit (ASIC), a Field Programmable Gate Array (FPGA), and/or other processing logic (e.g., embedded devices) capable of controlling network device 300. Memory 304 may include static memory, such as read only memory (ROM), and/or dynamic memory, such as random access memory (RAM), or onboard cache, for storing data and machine-readable instructions (e.g., programs, scripts, etc.).

Storage unit 306 may include a floppy disk, CD ROM, CD read/write (R/W) disc, and/or flash memory, as well as other types of storage devices (e.g., hard disk drive) for storing data and/or machine-readable instructions (e.g., a program, script, etc.). Depending on the context, the term "memory," "storage," "storage device," and/or "storage unit" may be used interchangeably. For example, a "computer-readable storage device" may refer to both a memory and/or storage device.

Input component 308 and output component 310 may provide input and output from/to a user to/from network device 300. Input/output components 308 and 310 may include a display screen, a keyboard, a mouse, a speaker, a microphone, a camera, a DVD reader, Universal Serial Bus (USB) lines, and/or other types of components for converting physical events or phenomena to and/or from signals that pertain to network device 300.

Network interface 312 may include a transceiver (e.g., a transmitter or receiver) for network device 300 to communicate with other devices and/or systems. For example, via network interface 312, network device 300 may communicate over a network, such as the Internet, an intranet, a terrestrial wireless network (e.g., a WLAN, WiFi, WiMax, etc.), a satellite-based network, an optical network, etc. Network interface 312 may include a modem, an Ethernet interface to a LAN, and/or an interface/connection for connecting network device 300 to other devices (e.g., a Bluetooth interface).

Communication path 314 may provide an interface through which components of network device 300 can communicate with one another.

Figure 4:
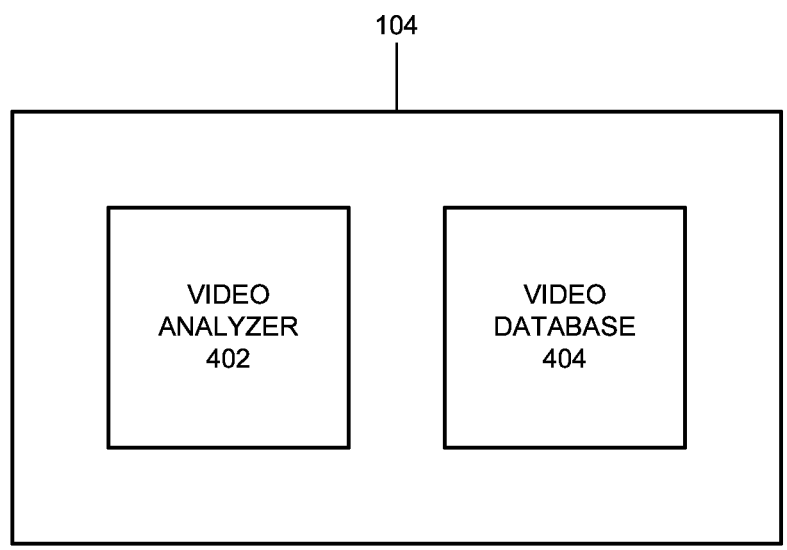
FIG. 4 is a functional block diagram of the video analysis device of FIG. 1.

FIG. 4 is a functional block diagram of video analysis device 104. As shown, video analysis device 104 may include a video analyzer 402 and a video database 404. In some implementations, one or more of these components may be implemented as computer-executable instructions or by processor 302 executing instructions that are stored in a computer-readable storage device. In other implementations, one or more of these components may be implemented in hardware. Although not illustrated, video analysis device 104 may include additional components, such as components illustrated in network device 300, an operating system (e.g., Linux, Windows, etc.), an application (e.g., a web browser), etc.

Video analyzer 402 may compare images, transform images (e.g., scale, translate, rotate, etc.), determine qualities of videos, and/or other operations that are related to video processing. In particular, video analyzer 402 may synchronize two videos. Video database 404 may include videos for analysis by video analyzer 402. In one implementation, video database 404 may include sets of files, where each set corresponds to a video and files of the set correspond to frames of the video.

Figure 5:
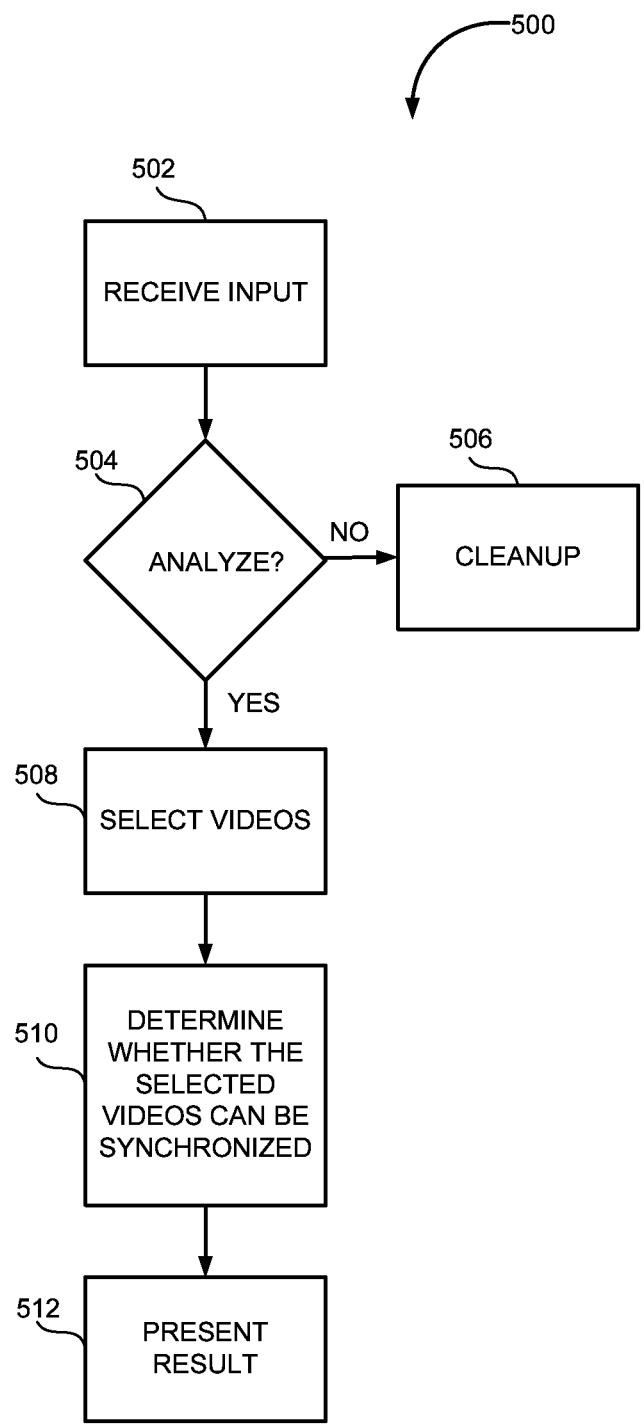
FIG. 5 is a flow diagram of an exemplary process that uses a video synchronization process.

FIG. 5 is a flow diagram of an exemplary process 500 that uses a video synchronization process. Process 500 may occur, for example, within an application that includes a graphical user interface (GUI). Process 500 may begin with video analyzer 402 receiving user input (block 502). The user input may indicate, for example, whether the user wishes the application to perform an analysis (e.g., whether two videos are similar, whether two videos can be synchronized, etc.). In another example, the input may identify which two videos need to be compared or synchronized.

If the input indicates that the user does not wish one or more videos to be analyzed (e.g., the user activates a "cancel" button on a menu) (block 504—NO), video analyzer 402 may perform a cleanup operation (block 506). For example, video analyzer 402 may remove a pop-up window from a display screen, redraw a GUI window, provide for a different menu, delete an object from memory 304, etc.

Otherwise (block 504—YES), video analyzer 402 may select two videos to be compared or synchronized in accordance with other user input (block 508). For example, assume that the user has sent (e.g., via a web user interface) a video clip to video analysis device 104. In response, video analyzer 402 in video analysis device 104 may identify a list of videos from which a match may be identified via video synchronization.

Video analyzer 402 may determine whether two or more videos can be synchronized (block 510). Furthermore, video analyzer 402 may use the result of the determination to provide a response to the user input received at block 502 (e.g., the name of a video that can be synchronized with a video that the user selected, the quality of a first video stream in comparison to a second video stream to which the first video stream can be synchronized, etc.) (block 512).

Figure 6:
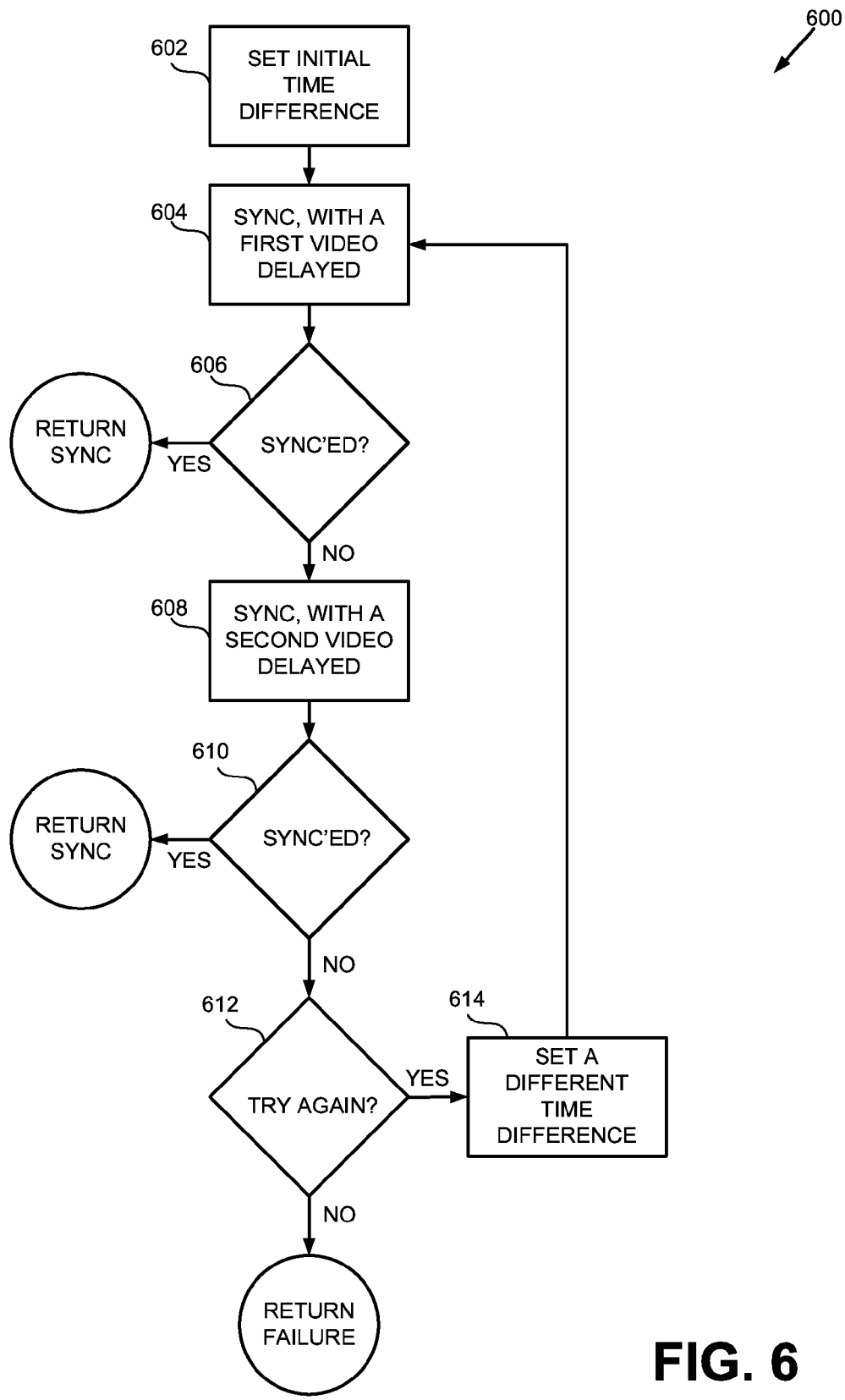
FIG. 6 is a flow diagram of an exemplary process for determining whether two video streams can be synchronized.
Figure 7A:
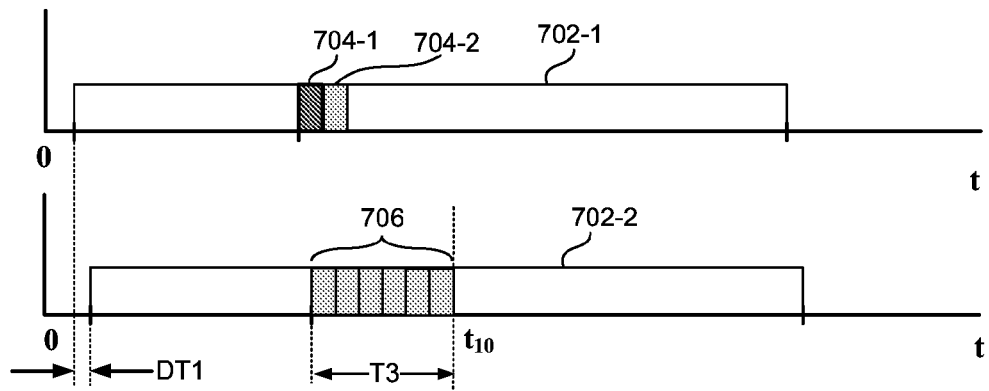
FIGS. 7A and 7B are diagrams illustrating an overview of the exemplary process of FIG. 6.
Figure 7B:
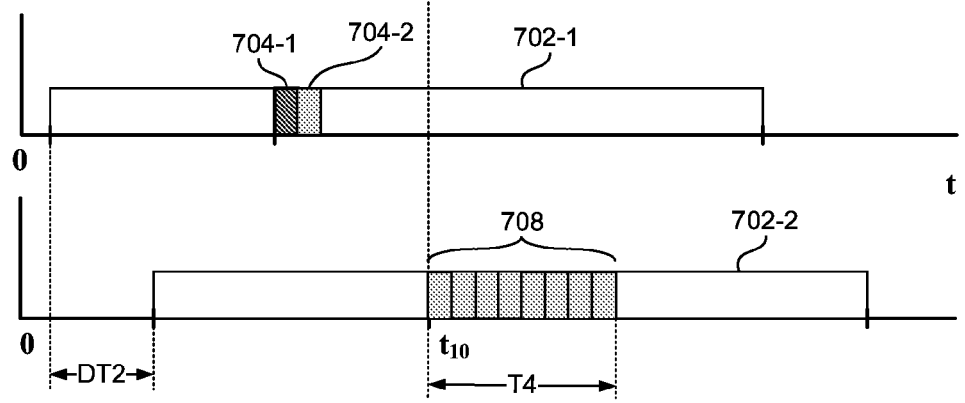

FIG. 6 is a flow diagram of an exemplary process 600 for determining whether two videos can be synchronized. Process 600 may correspond to block 510 in FIG. 5. FIGS. 7A and 7B are diagrams illustrating an overView of process 600. As shown in FIG. 7A, video analyzer 402 may determine whether two videos can be synchronized in accordance with process 600, by comparing video streams 702-1 and 702-2. Process 600 may begin by locating, in video stream 702-1, two frames 704-1 and 704-2 (collectively "frames 704" and individually "frame 704") in which images change (e.g., a scene change occurs between frame 704-1 and frame 704-2).

Video analyzer 402 assumes that video stream 702-2 may lag or precede video stream 704-1 by a time difference, DT1. Thereafter, video analyzer 402 searches, in video stream 702-2, for two frames that are similar to and correspond to frames 704. The search may be performed over frames 706, or equivalently, over a time period T3 during which frames 706 can be played by a device (e.g., content player device 102-1). If video analyzer 402 finds the corresponding frames in video stream 702-2, process 600 may return to the process that called or invoked process 600 (e.g., process 500).

If video analyzer 402 does not locate, in video stream 702-2, two frames that correspond to frames 704, video analyzer 402 performs another search for the corresponding frames in video stream 702-2, with a time difference, DT2, as illustrated in FIG. 7B. Video analyzer 402 may re-detect frames 704 and perform the search for the corresponding frames over frames 708, or, equivalently, over a time period T4.

If video analyzer 402 locates the corresponding frames in video stream 702-2, process 600 may return to the process that called or invoked process 600. Otherwise, process 600 may assume that video stream 702-1 may lag or precede video stream 704-2 by even a larger time difference (e.g., DT3).

In this manner, video analyzer 402 may continue the search with increasing time differences between video streams 702-1 and 702-2, until video analyzer 402 either finds the frames in video stream 702-2 or determines that video streams 702-1 and 702-2 cannot be synchronized (e.g., video analyzer 402 has performed a number of searches that exceeds a threshold). In either case, process 600 may return to the calling process.

Returning to FIG. 6, process 600 may begin with video analyzer 402 setting or assuming an initial time difference (e.g., latency, delay, etc.) between a first video stream and a second video stream (block 602). For example, video analyzer 402 may set the time difference to zero. Thereafter, video analyzer 402 may attempt to synchronize the two video streams, with the assumption that the first video stream lags the second video stream by the time difference (block 604).

If the video streams are successfully synchronized (block 606—YES), process 600 may return to, for example, block 512 of process 500, along with an indication that the two videos can be/have been synchronized. Otherwise (block 606—NO), video analyzer 402 may attempt to synchronize the two video streams again, with the assumption that the second video stream lags the first video stream by the same time difference (block 608). If video analyzer 402 is able to successfully synchronize the two videos (block 610—YES), video analyzer 402 may return to, for example, block 512 of process 500, along with an indication that the two videos can be/have been synchronized.

Video analyzer 402 may determine whether video analyzer 402 needs to try again to synchronize the video streams (block 612). For example, video analyzer 402 may count the number of times that video analyzer 402 has attempted to synchronize the two video streams. If the number is greater than a predetermined threshold (e.g., five attempts), video analyzer 402 may conclude that no additional attempt to synchronize the videos needs to be made.

If video analyzer 402 determines that another attempt to synchronize the two videos is necessary (block 612—YES), video analyzer 402 may set a different time difference (e.g., a longer latency) (block 614), and proceed to block 604. Otherwise (block 612—NO), process 600 may return to, for example, block 512 of process 500, with an indication that the two videos cannot be synchronized.

Figure 8:
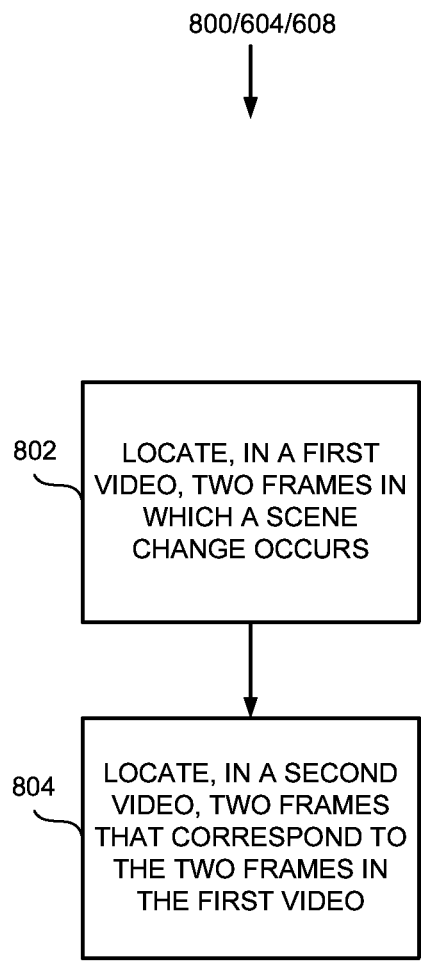
FIG. 8 is a flow diagram of an exemplary process for synchronizing two video streams.

FIG. 8 is a flow diagram of an exemplary process 800 for synchronizing two video streams. Process 800 may correspond to a process performed at block 604 or 608 of process 600. As shown, process 800 may include blocks 802 and 804. At block 802, video analyzer 402 may find or locate, in a first of the two videos being synchronized, two frames in which a change in scene occurs. At block 804, video analyzer 402 may find or locate, in the second of the two videos, two frames that correspond to the two frames located in the first video stream. In locating the two corresponding frames in the second video stream, video analyzer 402 may search for the two frames within a time window that is shifted relative to the two frames in the first video stream by a time difference set at block 604 or block 608 in process 600. As already discussed above, the magnitude of the time difference (latency/time delay) may be set at block 614.

Figure 9:
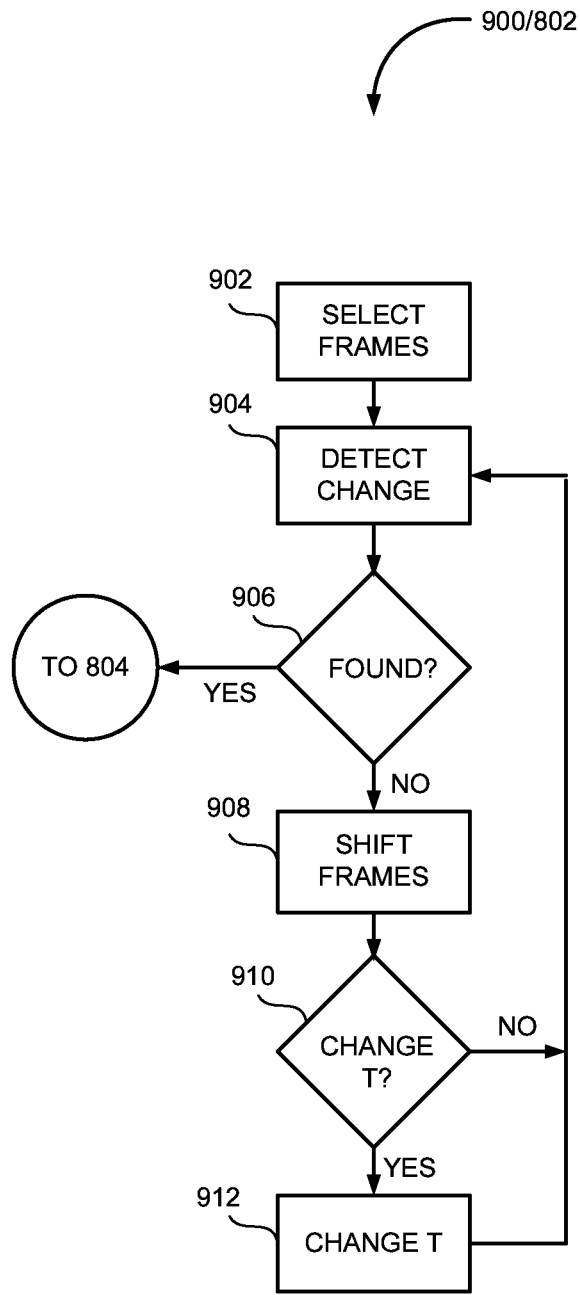
FIG. 9 is a flow diagram of an exemplary process for detecting, in a first video stream, two consecutives video frames in which a scene change occurs.
Figure 10:
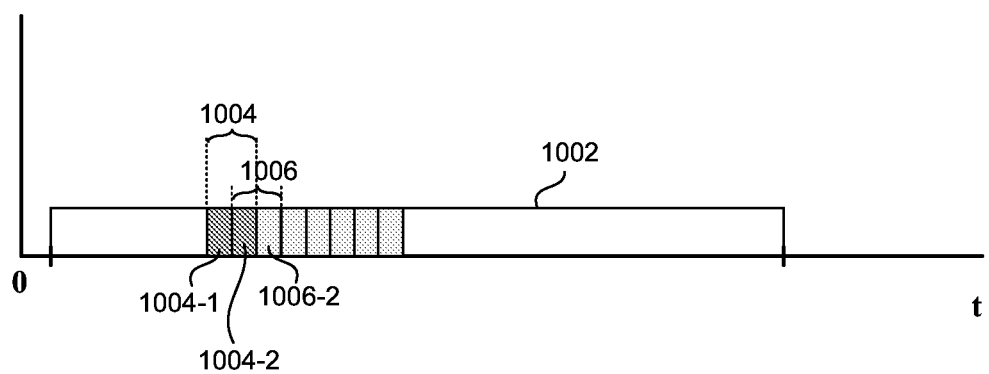
FIG. 10 is a diagram illustrating an overview of the exemplary process of FIG. 9.

FIG. 9 is a flow diagram of an exemplary process 900 for detecting, in a first of the two video streams, two consecutive video frames in which a scene change occurs. Process 900 may correspond to block 802 of process 800. FIG. 10 is a diagram illustrating an overview of process 900. As shown in FIG. 10, video analyzer 402 may compare, within a video stream 1002, a pair 1004 of two consecutive frames 1004-1 and 1004-2. If video analyzer 402 determines that frames 1004-1 and 1004-2 are sufficiently different, video analyzer 402 may conclude that a scene change has occurred, and return to calling process 800.

Otherwise, video analyzer 402 may conclude that a scene change has not occurred, and proceed to compare the next pair 1006 of frames 1004-2 and 1006-2. If video analyzer 402 determines that frames 1004-2 and 1006-2 are sufficiently different, video analyzer 402 may conclude that the a scene change has occurred in pair 1006, and return to calling process 800. Otherwise, video analyzer 402 may conclude that a scene change has not occurred, and repeat the preceding portion of process 900, with the following pair of frames (not labeled).

In process 900, as video analyzer 402 continues to attempt to detect a change in scene in successive pairs of frames, video analyzer 402 may gradually decrease the threshold to which the sum of the differences of the frames are compared. By lowering the threshold, video analyzer 402 may increase the probability of detecting a change.

Returning to FIG. 9, process 900 may begin with video analyzer 402 selecting a first pair of frames (block 902). Video analyzer 402 may determine whether a change in scene occurs in the frames (block 904). If there is a change in scene (block 906—YES), process 900 may return to block 804 of process 800. Otherwise (block 906—NO), process 900 may select the next pair of frames in the first video stream (block 908).

Video analyzer 402 may determine whether a threshold T for detecting a difference between the two selected frames is to be changed (block 910), based on one or more factors. For example, in one implementation, video analyzer 402 may determine, over a period of time, whether a sufficient number of pairs of consecutive frames have been tested for a change in scene.

If threshold T is not to be changed (block 910—NO), video analyzer 402 may return to block 904. Otherwise (block 910—YES), video analyzer 402 may decrement the threshold by a predetermined amount (block 912), and return to block 904. In some implementations, there may be a lowest threshold value below which video analyzer 402 does not further decrease the threshold.

In process 900, by adaptively lowering threshold T, video analyzer 402 provides for detecting a scene change even when frames of the first video stream are relatively similar. The value of threshold T may correspond to a degree of homogeneity of the video stream.

Figure 11:
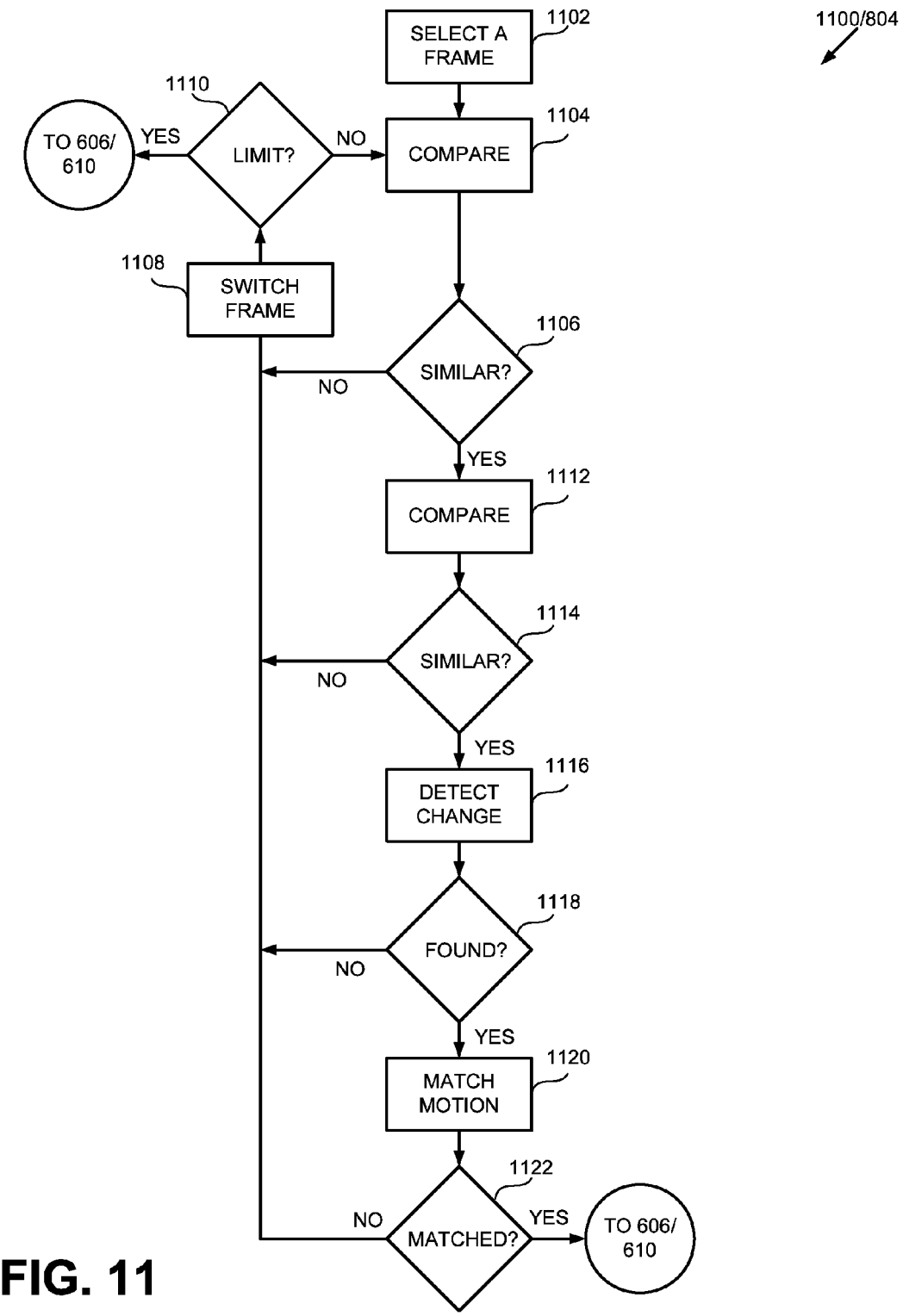
FIG. 11 is a flow diagram of an exemplary process for detecting, in a second video stream, two consecutives video frames that correspond to the two video frames detected by the process of FIG. 9.

FIG. 11 is a flow diagram of an exemplary process 1100 for detecting, in a second video stream of the two videos, two consecutive video frames that correspond to the two video frames detected by process 900. To begin, video analyzer 402 may select a frame in the second video stream (block 1102). In selecting the frame, video analyzer 402 may account for at least two factors: the time at which the scene change occurred in the first video stream and a time difference between the second video stream relative to the first video stream (e.g., latency). As discussed above, the time difference may have been set by the process that invoked or called process 1100 (e.g., process 600 at block 604 or 608).

For example, assume that the scene change occurred at $100^{th}$ frame of the first video stream and the time difference is equivalent to a span of time for displaying 10 frames of the second video stream. In such a case, video analyzer 402 may select the $(100+10)^{th}$ frame of the second video stream at block 1102.

Video analyzer 402 may compare a first of the two frames detected in the first video stream to the frame selected from the second video stream at block 1102 (block 1104). If video analyzer 402 determines that the two frames are not similar (block 1106—NO), process 1100 may proceed to block 1108. At block 1108, video analyzer 402 may select a frame that follows the selected frame in the second video stream (i.e., switch to the next frame) (block 1108). Process 1100 may proceed to block 1110.

Video analyzer 1110 may determine whether all frames of the second video stream within a preset time window (e.g., T3 in FIG. 7A or T4 in FIG. 7B) have been compared to the first of the two frames detected in the first video stream. If the frames have been compared (block 1110—YES), process 1110 may terminate, and return to the calling process (e.g., process 600 at block 606 or block 610). Otherwise (block 1110—NO), process 1110 may return to block 1104.

If video analyzer 402 determines that the frame selected from the second video stream is similar to the first of the two frames detected in the first video stream (block 1106—YES), process 1100 may proceed to 1112, where video analyzer 402 may compare a second of the two frames detected in the first video stream to a frame following the selected frame in the second video stream (block 1112).

If video analyzer 402 determines that the second of the two frames in the first video stream is not similar to the second frame in the second video stream (block 1114—NO), process 1100 may go to block 1108. Otherwise (block 1114—YES), the two frames in the second video stream correspond to the two frames in the first video stream, and video analyzer 402 may detect whether a change in scene occurs in the two frames of the second video stream (block 1116).

If there is no change in scene, process 1100 may proceed to block 1108. If there is a change in scene (block 1118—YES), video analyzer 402 may determine whether the change matches the change in scene in the two frames in the first video stream. For example, assume that video analyzer 402 stores, in a first array, information related to a change in scene in the two frames of the first video stream and stores, in a second array, information pertaining to a change in scene in the two frames of the second video stream. In such an instance, to determine whether the change in scene in the first video stream matches the change in scene in the second video stream, video analyzer 402 may determine, for each element in the first array and each corresponding element in the second array, an absolute value of the difference between the corresponding elements of the arrays. Further, video analyzer 402 may obtain the sum of the absolute values for all of the elements of the arrays, normalized by the total number of elements in the first or second array. The normalized sum may represent the degree of match between the change in scene in the first video stream and the change in scene in the second video stream.

Video analyzer 402 may determine whether the change in scene in the first video stream matches the change in scene in the second video stream (block 1122). For example, video analyzer 402 may compare the normalized sum obtained from the first and second arrays to a predetermined threshold. If the normalized sum is greater than the threshold, video analyzer 402 may determine that there is no match (block 1122—NO), and process 1100 may go to block 1108. Otherwise (block 1122—YES), process 1100 may return to the calling process (e.g., process 600) with an indication that the two frames in the first video stream match the two corresponding frames in the second video stream.

In process 1100, video analyzer 402 may perform the initial comparison at block 1104 with a relatively low threshold. This may provides for detecting two corresponding frames in distorted videos. Although the low threshold tends to increase the probability of obtaining false positives, video analyzer 402 neutralizes or negates this by performing acts that are associated with blocks 1114,1118, and 1122. Each of blocks 114, 1118, and 1122 provides for additional hurdles for achieving video synchronization, and therefore, decreases the probability of obtaining false positive synchronization.

Figure 12:
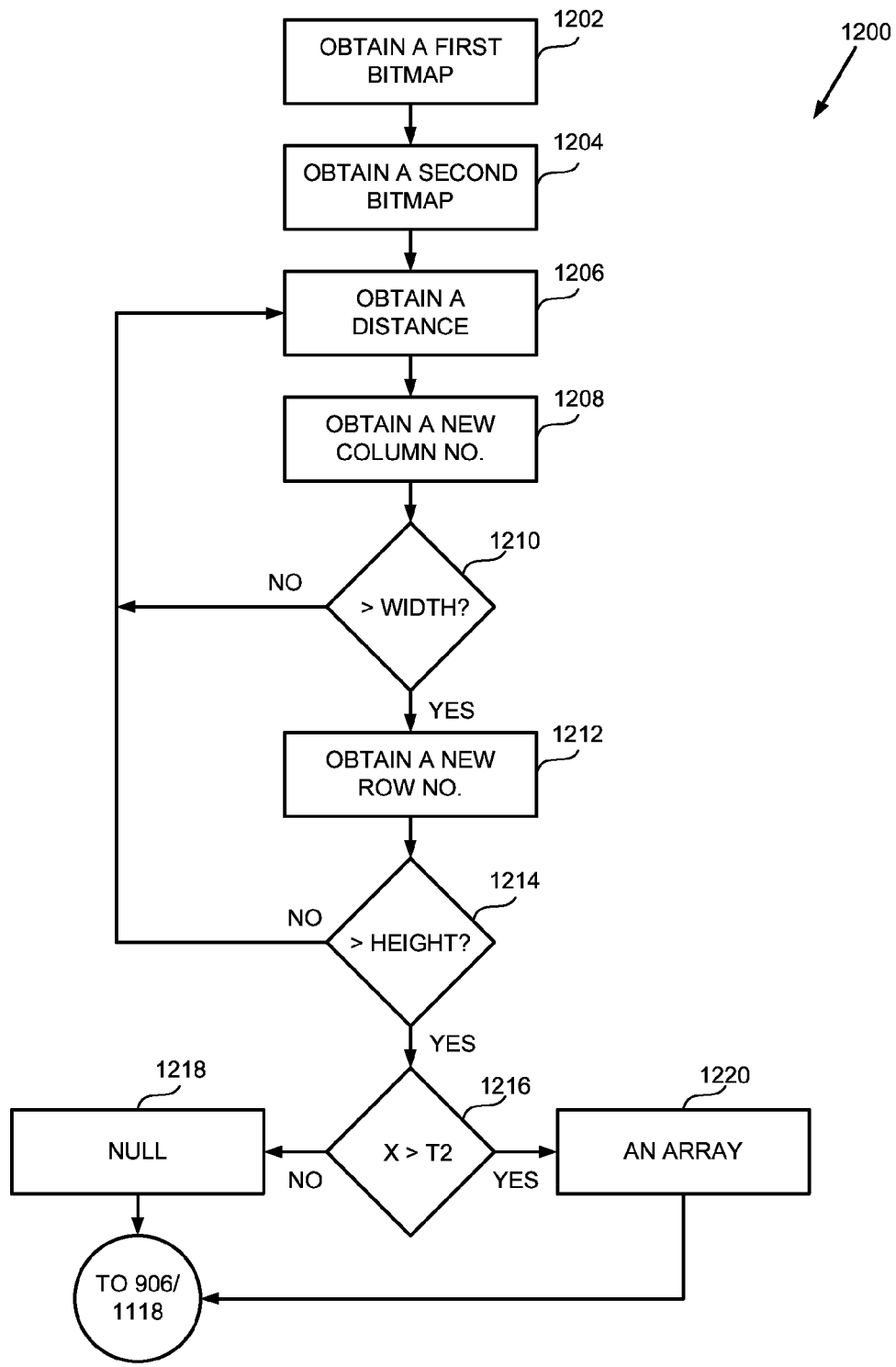
FIG. 12 is a flow diagram of an exemplary process for determining a difference between two frames.
Figure 13:
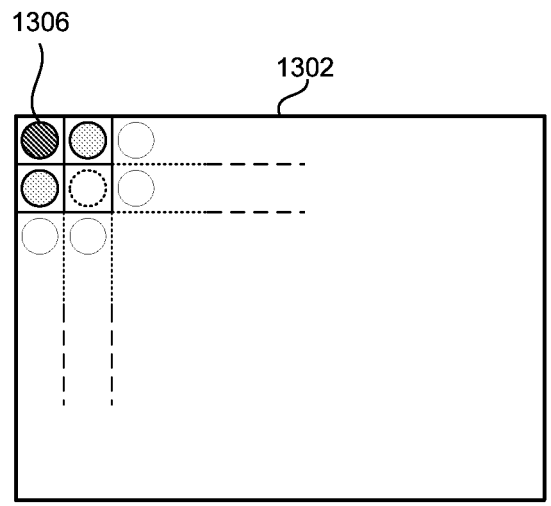
FIG. 13 is a diagram illustrating an overview of the exemplary process of FIG. 12.
Figure 13:
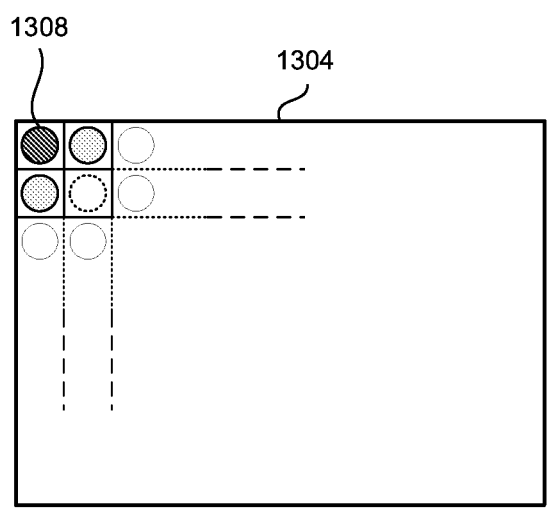

FIG. 12 is a flow diagram of an exemplary process 1200 for determining a difference between two frames. Process 1200 may correspond to a process performed at block 904 or block 1116. FIG. 13 is a diagram illustrating an overview of process 1200. In FIG. 13, assume that video analyzer 402 has obtained a bitmap 1302 from frame 1004-1 in the first video stream and a bitmap 1304 from frame 1004-2 (e.g., the frame which follows frame 1004-1) in the first video stream. Video analyzer 402 may compute, for each pixel in bitmap 1302 and a corresponding pixel in bitmap 1304, a difference of the two pixels. For example, video analyzer 402 may calculate a difference between a numerical value corresponding to pixel 1306 and a numerical value corresponding to pixel 1308. Each of the differences between the pixels in bitmaps 1302 and 1304 may be stored in an array.

Returning to FIG. 12, video analyzer 402 may begin process 1200 by obtaining a first bitmap from a first of two consecutives frames of the first video stream (block 1202). Video analyzer 402 may obtain the bitmap by, for example, invoking an operating system call, a video Application Programming Interface (API), etc. Similarly, video analyzer 402 may also obtain a second bitmap from a second of the two consecutive frames of the first video stream (block 1204). In addition, video analyzer 402 may select an initial column number and row number of the first bitmap (e.g., zeroth column and row in the first bitmap), in effect selecting a first pixel in the first bitmap for processing at block 1206.

Video analyzer 402 may obtain a distance X between the selected pixel in the first bitmap and a corresponding pixel in the second bitmap (block 1206). In one implementation, distance X may be obtained by the following expression:

$X$=Weight·abs(blue color component of the selected pixel in the first bitmap−blue color component of a corresponding pixel in the second bitmap)+abs (red color component of the selected pixel in the first bitmap−red color component of the corresponding pixel in the second bitmap)+abs(green color component of the pixel in the first bitmap−green color component of the corresponding pixel in the second bitmap).

Video analyzer 402 may obtain a new column number (e.g., new column number=prior column number+1), to select another pixel in the first bitmap and a corresponding pixel in the second bitmap (block 1208). Furthermore, video analyzer 402 may determine whether the newly obtained column number exceeds a width of the first/second bitmap (block 1210). If the column number does not exceed the width (block 1210—NO), process 1200 may return to block 1206, to obtain the distance between the newly selected pixel in the first bitmap and the corresponding pixel in second bitmap.

If the column number exceeds the width (block 1210—YES), process 1200 may proceed to block 1212, where video analyzer 402 obtains a new row number (block 1212). In addition, video analyzer 402 may reset the column number to the initial column number (e.g., zero).

Video analyzer 402 may determine whether the newly obtained row number exceeds a height of the first/second bitmap (block 1214). If the row number does not exceed the height (block 1214—NO), process 1200 may return to block 1206 to obtain the distance between a pixel, designated by the new column and row numbers, in the first bitmap and the corresponding pixel in the second bitmap. Otherwise (block 1214—YES), video analyze4 402 may conclude that all pixels in the first bitmap have been processed, and proceed to block 1216.

In the above, in the loop formed by blocks 1206 through 1214, for each distance X computed at block 1206, video analyzer 402 may also compute and store, in an array, a value D=f(X), where f(X) is 1 when X·constant>1 and f(X) is 0 when X·constant≤1. The dimension of the array may correspond to the number of pixels in the first/second bitmap. In addition, video analyzer 402 may accumulate the values of X over the loop formed by blocks 1206 through 1214.

Video analyzer 402 may determine whether the accumulated value of X is greater than a threshold T2 (block 1216). If the accumulated value of X is greater than the threshold T2 (block 1216—YES), process 1200 may proceed to block 1218 and return to the calling process (e.g., process 900/ 1100) with a null pointer value. If the accumulated value of X is less than or equal to the threshold (block 1216—NO), process 1200 may proceed to block 1218 and return to the calling process with the array in which values of D are stored.

In process 1200, depending on the implementation, video analyzer 402 may compute X and/or D in different ways. For example, in one implementation, video analyzer 402 may weight each of the color components differently in computing X.

Figure 14:
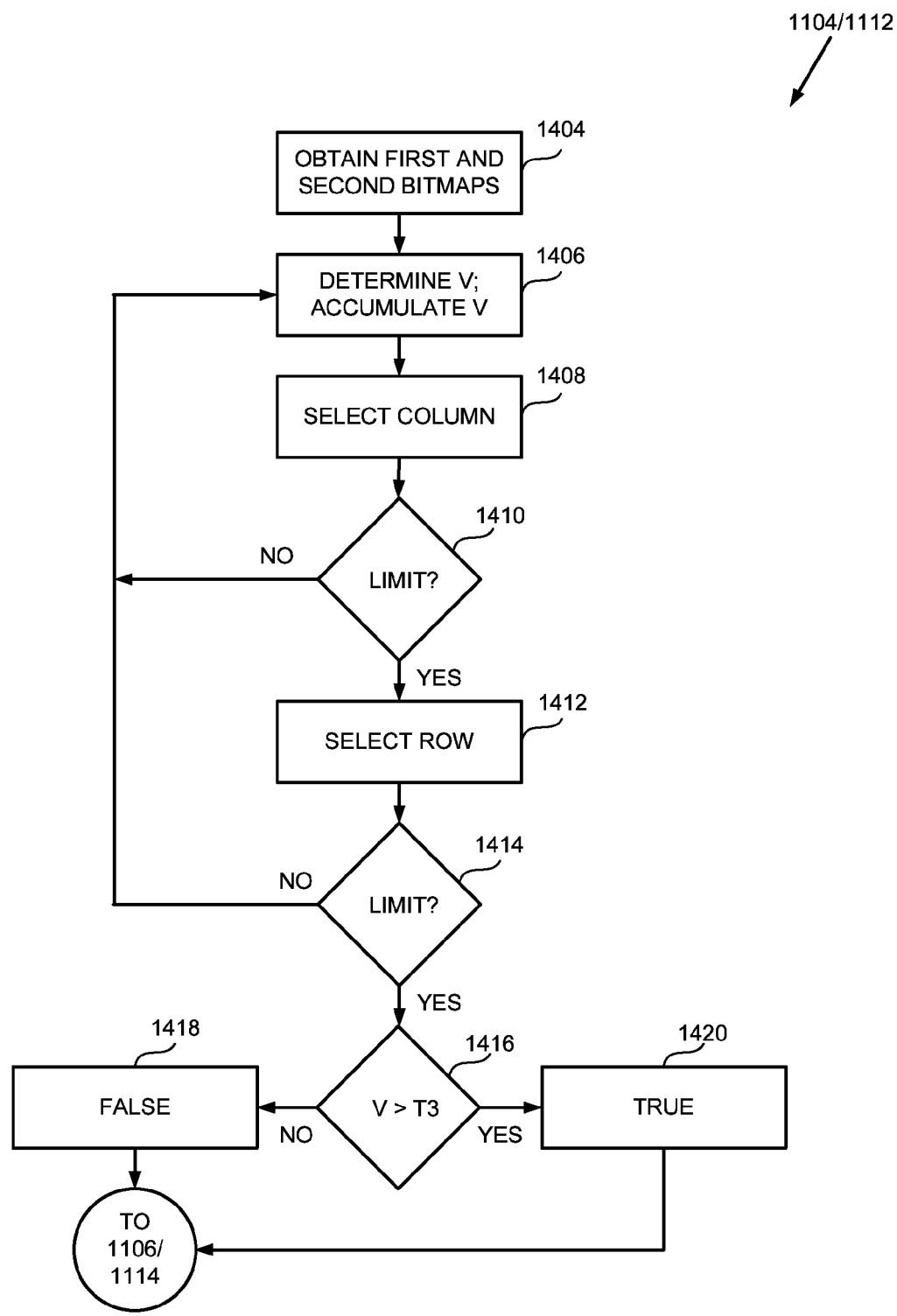
FIG. 14 is a flow diagram of an exemplary process for determining similarity between two frames.

FIG. 14 is a flow diagram of an exemplary process 1400 for determining similarity between two frames. Process 1400 may correspond to a process performed at block 1104 and/or 1112.

Video analyzer 402 may begin process 1400 by obtaining a first bitmap from a first frame and a second bitmap from a second frame (block 1404). The first and second frames may be, for example, the first of the two consecutive frames of the first video stream and the first of the two corresponding frames in the second video stream. In another example, the first and second frames may be the second of the two consecutive frames of the first video stream and the second of the two corresponding frames in the second video stream. In addition, video analyzer 402 may select an initial column number and row number of the first bitmap, in effect selecting a first pixel in the first bitmap for processing at block 1406.

From blocks 1406 through 1414, video analyzer 402 may process pixels in the first bitmap and second bitmaps in a manner similar to acts that are associated with blocks 1204 through 1214. More specifically, for each of the pixels in the first and second bitmaps, video analyzer 402 may obtain a distance V between the selected pixel in the first bitmap and a corresponding pixel in the second bitmap (block 1406). In one implementation, distance V may be obtained by the following expression:

$V$=Weight·(blue color component of the selected pixel in the first bitmap−blue color component of a corresponding pixel in the second bitmap)+(red color component of the selected pixel in the first bitmap−red color component of the corresponding pixel in the second bitmap)+(green color component of the pixel in the first bitmap−green color component of the corresponding pixel in the second bitmap).

In addition to computing V, video analyzer 402 may also accumulate the value of V over the pixels in the first bitmap and second bitmap (block 1406).

At the end of the loop formed by blocks 1406 through 1414, video analyzer 402 may compare the accumulated value of V to a predetermined threshold T3 (block 1416). If the accumulated value is greater than T3 (block 1416—NO), process 1400 may proceed to block 1420 and then return to the calling process (e.g., process 1100) with the indication that the frames corresponding to the first and second bitmaps are not similar (e.g., return "false."). Otherwise (block 1416—YES), process may proceed to block 1420 and then return to the calling process with the indication that the frames corresponding the first and second bitmaps are similar (e.g., return "true").

In the foregoing description, video analysis device 104 may perform different processes (e.g., processes 500 through 1400) for synchronizing two videos. Video analysis device 104 may locate a sequence of frames (e.g., images), in a first video stream, in which a scene change occurs, and locate the corresponding sequence of similar frames in a second video stream. Video analysis device 104 may synchronize the two video streams over a time span.

Depending on the implementation, video analysis device 104 may synchronize two videos for different reasons. For example, in one implementation, video analysis device 104 may synchronize the two videos to determine the quality of the second video stream relative to the first video. In another example, video analysis device 104 may synchronize the two videos to detect whether a first video stream includes a copy of all or a portion of the second video stream. In yet another example, a user may obtain and send a sample video (e.g., the first video stream) to a service/content provider, to identify a full-length video to which the sample video can be synchronized.

The foregoing description of implementations provides illustration, but is not intended to be exhaustive or to limit the implementations to the precise form disclosed. Modifications and variations are possible in light of the above teachings or may be acquired from practice of the teachings.

In addition, while series of blocks have been described with regard to exemplary processes illustrated in FIGS. 5, 6, 8, 9, 11, 12, and 14, the order of the blocks in the processes may be modified in other implementations. In addition, non-dependent blocks may represent acts that can be performed in parallel to other blocks. Further, the processes may include other blocks in different arrangements.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving a first video, at a device, from a first source device;
   receiving a second video, at the device, from a second source device different from the first source device;
   processing the first video to identify first frames, in the first video, in which a first change in scene occurs;
   in response to the identification of the first frames in the first video, processing the second video to identify second frames, in the second video, in which a second change in scene occurs, wherein the processing the second video includes:
      determining whether a first one of the first frames matches a first one of the second frames,
      in response to determining that the first one of the first frames matches the first one of the second frames, determining whether a second one of the first frames that immediately follows the first one of the first frames matches a second one of the second frames that immediately follows the first one of the second frames, and
      in response to determining that the first one of the first frames does not match the first one of the second frames, determining whether the first one of the first frames matches the second one of the second frames; and
   in response to the identification of the second frames in the second video, determining whether the first change in scene matches the second change in scene.

2. The method of claim 1, wherein receiving the first video includes:
   storing the first video as a sequence of files, wherein each one of the sequence of files stores a different frame among the frames of the first video.

3. The method of claim 1, wherein processing the first video includes:
   comparing a first pair of consecutive frames in the first frames; and
   detecting the first change in scene when a value measuring a difference of the first pair of consecutive frames is greater than a threshold.

4. The method of claim 3, wherein comparing frames of the first pair of consecutive frames includes:
   converting the first pair of consecutive frames into bitmaps;
   comparing the bitmaps; and
   generating the value based on the comparison of the bitmaps.

5. The method of claim 3, wherein processing the first video includes:
   comparing a second pair of consecutive frames of the first video to detect a change in scene when a change in scene is not detected in the first pair of consecutive frames.

6. The method of claim 1, wherein processing the first video includes:
   inspecting a sequence of pairs of consecutive frames of the first video until a change in scene is detected in one of the inspected pairs, wherein the one of the inspected pairs includes the first frames.

7. The method of claim 6, wherein inspecting the sequence of pairs includes:
   for each pair of frames, obtaining a series of values, each of the values indicating a distance between a pixel of a first one of the pair of frames and a corresponding pixel in a second one of the pair of frames.

8. The method of claim 7, wherein inspecting the sequence of pairs includes:
   for each pair of frames, obtaining a first value that indicates an overall difference between a first one of the pair of frames and a second one of the pair of frames; and
   comparing the first value to a threshold.

9. The method of claim 8, further comprising:
   decreasing the threshold when inspecting a number of the sequence of pairs of consecutive frames does not result in detecting a change in scene; and
   continuing to inspect the sequence of pairs of consecutive frames.

10. The method of claim 1, wherein processing the second video further includes:
    detecting a change in scene between the first one of the second frames and the second one of the second frames when the second one of the first frames that immediately follows the first one of the first frames matches the second frame that immediately follows the first one of the second frames.

11. The method of claim 10, wherein detecting the change in scene between the first one of the second frames and the second one of the second frames includes:

obtaining a first value that indicates an overall difference between the first one of the second frames and the second one of the second frames; and comparing the first value to a threshold.

12. The method of claim 11, wherein obtaining the first value includes:

calculating a value that represents a difference between a first pixel of the first one of the second frames and a first pixel of the second one of the second frames.

13. The method of claim 12, wherein calculating the first value includes:

for each of color components, obtaining a difference between the color component of the first pixel of the first one of the second frames and the first pixel of the second one of the second frames; and adding all of the differences between the color components of the first pixel of the first one of the second frames and the first pixel of the second one of the second frames.

14. The method of claim 1, wherein processing the second video includes:

identifying a time, relative to a start of the first video, at which the first change in scene occurs; and inspecting the second video to detect the second change in scene, where the inspection starts with a frame whose display time is offset from a start of the second video by an amount of time greater than the identified time.

15. The method of claim 14, wherein the identified time includes a latency in the second video relative to the first video.

16. A device comprising:

a network interface to transmit and to receive data;

a memory to store a first video and a second video; and one or more processors to:

receive the first video via the network interface, over a first time period;

receive the second video via the network interface, over a second time period that substantially overlaps the first time period;

process the first video to identify a first pair of frames, in the first video, in which a first change in scene occurs;

in response to the identification of the first pair of frames in the first video, process the second video to identify a second pair of frames, in the second video, in which a second change of scene occurs, by:

determining whether a first one of the first pair of frames matches a first one of the second pair of frames, in response to determining that the first one of the first pair of frames matches the first one of the second pair of frames, determining whether a second one of the first pair of frames matches a second one of the second pair of frames, and in response to determining that the first one of the first pair of frames does not match the first one of the second pair of frames, determining whether the first one of the first pair of frames matches the second one of the second pair of frames; and in response to the identification of the second pair of frames in the second video, determine whether the first change in scene matches the second change in scene.

17. A non-transitory computer-readable storage device, comprising computer-executable instructions, the computer-executable instructions to cause one or more processors executing the instructions to:

receive a first video from a first source device;

receive a second video from a second source device dufferebt from the first source device;

process the first video to identify a first pair of frames, in the first video, in which a first change in scene occurs;

process the second video to identify a second pair of frames, in the second video, in which a second change in scene occurs in response to the identification of the first pair of frames in the first video, by:

determining whether a first one of the first pair of frames matches a first one of the second pair of frames, when the first one of the first pair of frames is determined to match the first one of the second pair of frames, determining whether a second one of the first pair of frames matches a second one of the second pair of frames, and when the first one of the first pair of frame is determined not to match the first one of the second pair of frame, determining whether the first one of the first pair of frames matches the second one of the second pair of frames; and determine whether the first change in scene matches the second change in scene in response to the identification of the second pair of frames in the second video.

18. The non-transitory computer-readable storage device of claim 17, further comprising instructions for causing the one or more processors to:

receive user input requesting the first video and the second video to be synchronized.

19. The non-transitory computer-readable storage device of claim 17, further comprising instructions for causing the one or more processors to:

receive a stream of the first video from a content player device.

* * * * *